US012032112B2

United States Patent
Padhi et al.

(10) Patent No.: US 12,032,112 B2
(45) Date of Patent: Jul. 9, 2024

(54) MODEL-BASED CORRECTIONS TO ACOUSTIC PROPERTY VALUES OF ANNULAR MATERIAL TO MITIGATE IDEAL ARTIFACTS

(71) Applicant: Halliburton Energy Services, Inc., Houston, TX (US)

(72) Inventors: Amit Padhi, Cypress, TX (US); Christopher Michael Jones, Katy, TX (US); Xiang Wu, Singapore (SG); James Martin Price, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 376 days.

(21) Appl. No.: 17/646,732

(22) Filed: Jan. 3, 2022

(65) Prior Publication Data

US 2023/0213675 A1 Jul. 6, 2023

(51) Int. Cl.
*G01V 1/52* (2006.01)
*G01V 1/46* (2006.01)
*G06N 3/08* (2023.01)

(52) U.S. Cl.
CPC .................. *G01V 1/46* (2013.01); *G01V 1/52* (2013.01); *G06N 3/08* (2013.01); *G01V 2210/542* (2013.01)

(58) Field of Classification Search
CPC ...... G01V 1/46; G01V 1/52; G01V 2210/542; G06N 3/08
See application file for complete search history.

(56) References Cited

U.S. PATENT DOCUMENTS

| 10,401,522 | B2 | 9/2019 | Van Kuijk et al. |
| 2009/0012710 | A1 | 1/2009 | Van Os et al. |
| 2013/0282290 | A1* | 10/2013 | Weston .................. E21B 47/00 702/9 |
| 2018/0149019 | A1* | 5/2018 | Bose ..................... E21B 47/005 |
| 2019/0383965 | A1* | 12/2019 | Salman .................. G06N 3/08 |
| 2020/0301036 | A1 | 9/2020 | Ramfjord et al. |
| 2022/0178245 | A1* | 6/2022 | Fouda ..................... G06N 3/04 |
| 2022/0351037 | A1* | 11/2022 | Li .......................... G01N 1/08 |

FOREIGN PATENT DOCUMENTS

| EP | 2803815 | 11/2014 |
| KR | 20210150917 | 12/2021 |

OTHER PUBLICATIONS

"PCT Application No. PCT/US2022/070014, International Search Report and Written Opinion", dated Sep. 21, 2022, 9 pages.

* cited by examiner

*Primary Examiner* — Krystine E Breier
(74) *Attorney, Agent, or Firm* — DeLizio, Peacock, Lewin & Guerra, LLP

(57) ABSTRACT

A model is used to generate corrections to mitigate ideal condition artifacts in acoustic property values of an annular material in a cased wellbore. A mathematical model that generates acoustic property values at ideal conditions introduces artifacts into the acoustic property values. Acoustic measurements of an annular material are used to generate features that represent wellbore conditions and are not accounted for in the mathematical model that generates acoustic property values. A model will generate corrections for acoustic property values of an annular material with the features to yield a more accurate acoustic property profile for the annular material of a cased hole.

20 Claims, 5 Drawing Sheets

MODEL-BASED CORRECTIONS TO ACOUSTIC PROPERTY VALUES OF ANNULAR MATERIAL TO MITIGATE IDEAL ARTIFACTS

TECHNICAL FIELD

The disclosure generally relates to the field of Data Processing; Artificial Intelligence (AI)) and Application Using AI. The disclosure also relates to Hydraulic and Earth Engineering and Subterranean Waste Disposal, Containment, or Treatment.

BACKGROUND

A wellbore that is drilled into a geological formation contains casing that is cemented in place. After the wellbore is drilled and filled with mud, casing is placed in the wellbore, leaving the annular space between the geological formation and outside of the casing filled with mud and fluids that have migrated out of the formation. Cement is then pumped into the annulus, displacing the mud, to form a cement barrier between the casing and geological formation. When the cement properly sets, zonal isolation is achieved so that the target zones can be stimulated and/or produced without being affected by other zones. The cement also provides structural support to the casing and prevents corrosion of the casing caused by fluids of the geological formation. In some instances, the cement does not properly set due to poor quality or contamination, or fails to reach its target depth in the annulus due to leakage into the geological formation.

Acoustic properties of the annular material are computed to interpret the annular material and evaluate the annular condition. Acoustic properties are computed with acoustic measurements, which are obtained with a logging tool that pulses acoustic waves in multiple azimuthal directions in the wellbore at various depths. These computed acoustic properties are plotted as a function of depth and azimuth to create a profile of the annular condition. The distribution of cement around the casing, depth of the cement-annular fluid interface, compressive strength, and bond between the casing and cement barrier are considered when the annular condition is evaluated.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to applying corrections to the computed acoustic property values of an annular material in illustrative examples for ideal condition artifact mitigation. Embodiments of this disclosure can be applied to other computed acoustic properties of an annular material. In other instances, well-known instruction instances, protocols, structures, and techniques have not been shown in detail in order not to obfuscate the description.

Overview

The mathematical model that processes acoustic measurements to compute the acoustic properties of annular material is based on ideal conditions in the wellbore. These ideal conditions include a tool that takes acoustic measurements being concentric with the casing, a uniform casing thickness, fluid inside the casing that has an attenuation of zero, and the casing being concentric with the wellbore. These ideal conditions are not practical, resulting in input features of the mathematical model introducing artifacts ("ideal condition artifacts") into the acoustic properties and depicting an inaccurate representation of the annular material. As examples of the non-ideal factors not represented by a typical mathematical model, casing wall thickness likely varies due to the manufacturing process or a wellbore may have an angle of inclination greater than zero, leading to the tool gravitating away from the center axis of the casing.

A model has been designed and trained to predict corrections which are then applied to computed acoustic property values to at least mitigate these ideal condition artifacts and depict a better representation of the annular material. To account for the impact of the ideal condition artifacts, a model (such as random forest or neural network) is trained to output corrections for each computed acoustic property value at each azimuth and depth, resulting in more trustworthy data of annular material for interpretation. To capture the variety of scenarios that can be encountered, the model is trained with training datasets representing possible variations related to at least non-uniform casing thickness and different fluid attenuations. When deployed, the model will generate corrections for acoustic property values of annular material with input features that indicate conditions of a wellbore (i.e., measured casing thicknesses across azimuths, fluid attenuation, etc.) to yield a more accurate acoustic property profile for an annular material.

Example Illustrations

Figure 1:
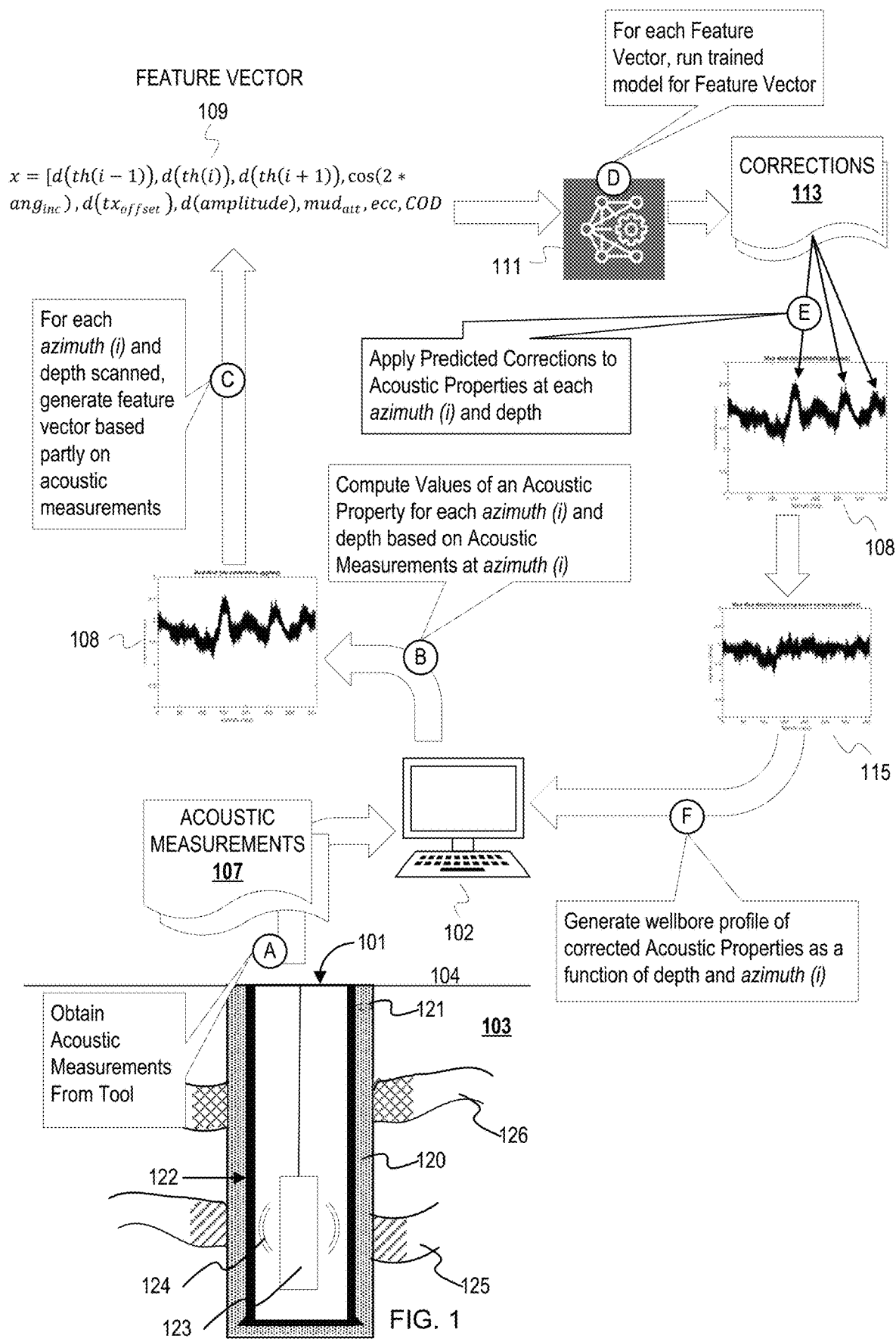
FIG. 1 illustrates an example system which generates corrections for computed acoustic property values of an annular material to mitigate ideal condition artifacts.

FIG. 1 illustrates an example system which generates corrections for computed acoustic property values of an annular material to mitigate ideal condition artifacts. The acoustic property correction generator system includes a trained model 111 having been trained to generate corrections based on input features that represent wellbore conditions, which are then applied to the computed acoustic property values to generate corrected acoustic property values. Acoustic properties can be, but are not limited to, impedance and flexural attenuation of the annular material. The trained model 111 generates a correction for each azimuth and depth indicated in the acoustic measurement dataset 107. FIG. 1 is annotated with letters A-F to indicate stages of operations to predict and apply corrections to the computed acoustic property values at an azimuth of a depth.

The series of stages are provided to aid in understanding the example illustration of FIG. 1 and not to limit the scope of the claims.

FIG. 1 depicts a partial cross section of an example wellbore 101 in a subsurface 103. The subsurface 103 comprises multiple geological formations like zone 125 and zone 126 that can contain fluids such as oil, natural gas, and water. The wellbore 101 is drilled through geological formations such that the formation fluids from the zones of interest can be produced into the wellbore 101. The wellbore 101 contains a casing 122 to isolate the wellbore 101 from the geological formations and allow formation fluids to produce into the wellbore 101 from only the zone(s) of interest. The annulus 121 between the casing 122 and geological formations is initially filled with mud and formation fluids after the casing 122 is placed in the wellbore 101. Cement 120 is pumped into the annulus 121 to provide structural support to the casing 122, protect the casing 122 from corrosion caused by formation fluids, isolate the zones of the geological formation so that the zones cannot interact with each other, and allow the production of formation fluids only out of the zone(s) of interest into the wellbore 101. The example wellbore 101 portrays cement 120 in the annulus 121 extending to surface 104. In some situations, cement is above and beneath the surface 104 and other annular material including, but not limited to, mud, water, or formation fluids can be in the annulus. Acoustic measurements 107 are used to compute acoustic property values 108 of the annular material to assist in the evaluation of the annular material. For example, the impedance of the annular material can assist in evaluating the bond between the cement 120 and the casing 122. The computed acoustic property values 108 of the annular material can include, but are not limited to, impedance or flexural attenuation.

At stage A, the acoustic measurements 107 are obtained based on acoustic waves 124 emitted from the tool 123 and uploaded to a computer system 102 that hosts an acoustic property program generator. This program code analyzes variations in the amplitudes of the acoustic waves 124 as they reflect off the casing 122, cement 120 (or other annular material), and geological formations to generate the acoustic measurements 107. The acoustic waves 124 are emitted with techniques including, but not limited, to pulse-echo and pitch-catch ultrasonic techniques. The acoustic measurements 107 can be sonic or ultrasonic data. The acoustic measurements 107 comprise inspection properties of the casing 122 such as casing thickness, position of the tool 123 with respect to the inner wall of the casing 122, properties of fluid in the casing 122 such as attenuation, and properties of the acoustic waves 124 emitted by the tool 123 such as amplitude and angle of incidence. The acoustic measurement 107 are measurements for a plurality of azimuths of a plurality of depths.

At stage B, acoustic property values 108 of the annulus material for each azimuth and depth are computed with a mathematical model based on the acoustic measurements 107 at the respective azimuth and depth. The acoustic property values 108 are computed assuming ideal conditions (e.g., tool 123 is centered in the casing 122, casing 122 has a uniform thickness, inner wall of the casing 122 is clear of any debris, fluid inside the casing has an attenuation of zero). The computed acoustic property values 108 depict an inaccurate representation of the annular material due to ideal condition artifacts introduced by the mathematical model. Ideal conditions are used in the mathematical model for efficiency in computing acoustic property values but sacrifice accuracy because the actual wellbore conditions are not considered. For example, ideal conditions assume the casing thickness is uniform across all azimuths at a depth where actual casing thickness will vary between azimuths at the respective depth. To accurately represent the annular material, corrections must be applied to the computed acoustic property values 108 at each azimuth and depth.

At stage C, for each azimuth and depth a feature vector 109 is generated based partly on acoustic measurements 107. Feature vector 109 comprises features that represent wellbore 101 conditions that are not accounted for in the computation of acoustic property values 108. The feature vector 109 provides a numerical representation of the features for the trained model 111 such that the trained model 111 can generate corrections to mitigate the ideal condition artifacts. The feature vector 109 at each azimuth comprises features with relative changes in quantities with respect to the mean value of the feature obtained in the acoustic measurements such as the thickness of the casing 122 at an azimuth, the thickness of the casing 122 at each neighboring azimuth, distance/offset between the transducer of the tool 123 and the inner wall of the casing 122, and amplitude of the first acoustic wave 124 reflected off the inner wall of the casing 122. In some embodiments, the relative change can be represented as a percentage. The feature vector 109 can also comprise absolute features such as the attenuation of fluid in the casing 122, and eccentricity. Feature vector 109 can include alternate features obtained from the acoustic measurements 107 depending on the desired acoustic property value. For example, the features for computing impedance will differ from the features for computing flexural attenuation. FIG. 9 depicts the feature vector 109 as $x = [d(th(i-1)), d(th(i)), d(th(i+1)), \cos(2*ang_{inc}), d(tx_{offset}), d(amplitude), mud_{att}, ecc, COD]$.

The feature vector 109 is represented by x with examples features including: $d(th(i))$ representing the difference in casing thickness at azimuth i from a mean casing thickness, $d(th(i-1))$ and $d(th(i+1))$ representing the differences in casing thicknesses at neighboring azimuths i−1 and i+1 from the mean casing thickness, $\cos(2*ang\_inc)$ representing a cosine of double the angle of incidence of the acoustic waves at i, $d(tx\_offset)$ representing a difference in offset of the tool at i from the mean tool offset, $d(amplitude)$ representing a difference in amplitude of an acoustic wave reflected off the inner casing wall measured at i from the mean amplitude, mud_att attenuation of the fluid, ecc represents eccentricity, and COD representing outer casing diameter.

At stage D, the feature vector 109 for each azimuth and depth is input into a trained model 111 to output a correction for that azimuth and depth. This cumulatively generates corrections 113. The trained model 111 generates corrections 113 for the computed acoustic property values 108. The corrections 113 mitigate the ideal condition artifacts within the computed acoustic property values 108 that were introduced by the mathematical model. In some embodiments, the corrections 113 may be expressed as a percentage of the computed acoustic property value. The trained model 111 can be, but is not limited to, an ensemble of decision trees model and an artificial neural network model. The training of the trained model will be explained in more detail in the flowcharts.

At stage E, the corrections 113 are applied to the computed acoustic property values 108. Each correction in the corrections 113 will have a corresponding computed acoustic property value in the acoustic property values 108 at the respective azimuth and depth. Applying the corrections 113 to the computed acoustic property values 108 yields corrected acoustic property values 115 of the annular material.

As with the computed acoustic property values 108, a graph represents the corrected acoustic property values 115 across azimuths at one of the depths. The corrected acoustic property depicts a more accurate representation of the acoustic property values of the annular material.

At stage F, a wellbore profile is generated with the corrected acoustic property values 115 as a function of azimuth and depth. This wellbore profile can illustrate an accurate depiction of the annular material of the wellbore 101 to assist in evaluating the annular condition, such as if zonal isolation were achieved between zone 125 and zone 126 or the bond between the casing 122 and cement 120 is sufficient.

Figure 2:
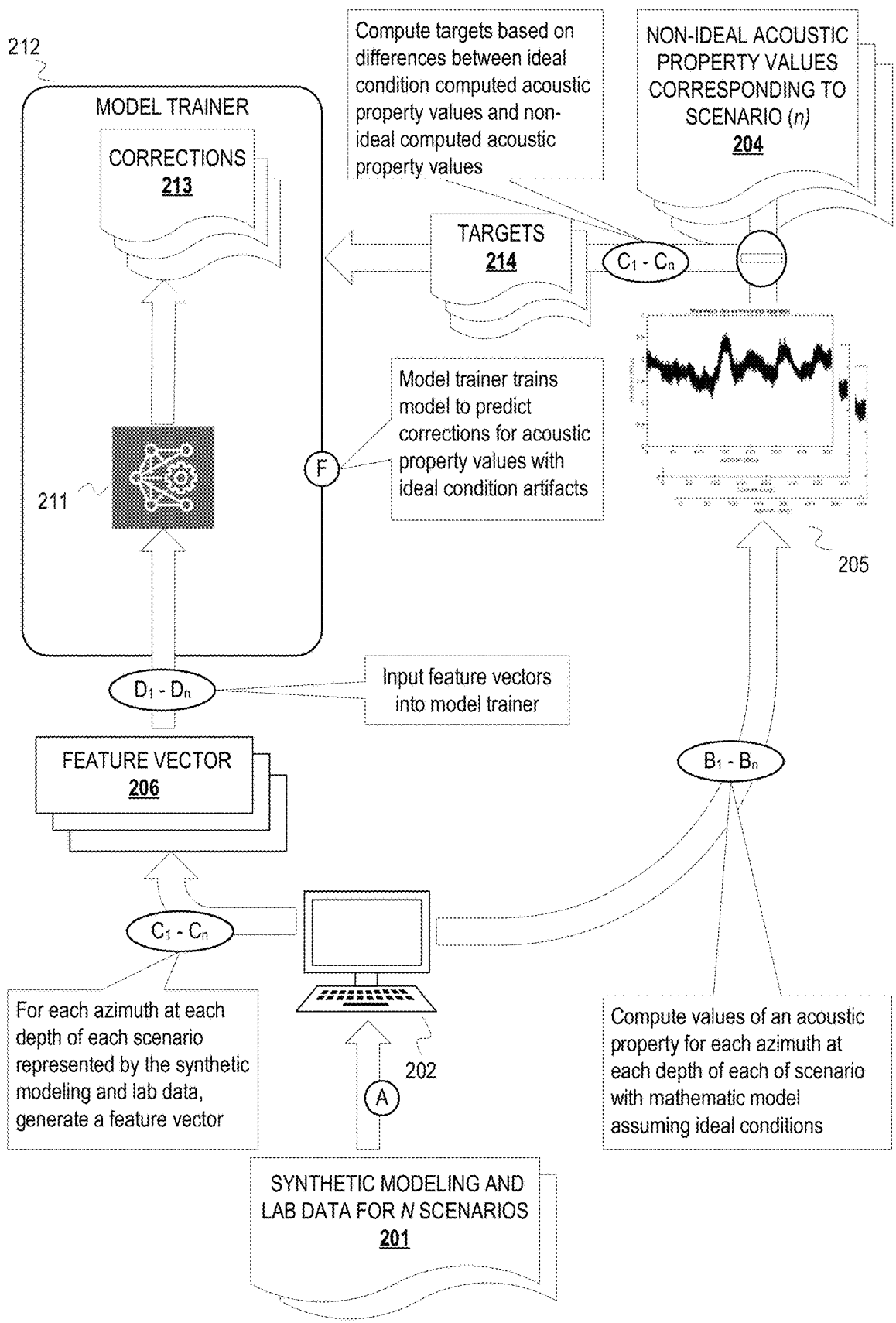
FIG. 2 illustrates an example operation for training a model to generate corrections for computed acoustic properties of an annulus material.

FIG. 2 is a conceptual diagram of a model being trained to obtain a model for correcting computed acoustic properties. FIG. 2 depicts a model trainer 212 to train a model 211. The model trainer 212 represents a training algorithm for a model type of the model 211. For this illustration, the model trainer 212 trains the model 211 with a training dataset based on synthetic modeling and lab data 201. FIG. 2 is annotated with letters A-F to indicate stages of operations. Each stage may encompass one or multiple operations.

At stage A, synthetic modeling and lab data 201 is obtained and processed with program code hosted on a computer 202. The synthetic modeling and lab data 201 can be obtained by performing simulations of multiple practical scenarios. The simulations can be done for various combinations of various wellbore configurations. Examples of the parameters that may be varied across simulations include casing thickness, fluid types, locations of fluids, annular material, and casing diameter. A simulated scenario, as an example, can have a casing with a 7-inch outer diameter, mud inside the casing, and fresh water in the annulus. The simulated scenario can pseudo-randomly vary thickness of the casing across azimuths within defined boundaries. The simulated scenario can simulate inserting a tool into the simulated cased wellbore and generate synthetic acoustic measurements at each azimuth and each depth specified for the scenario. The synthetic data for each simulated scenario also includes values for one or more acoustic properties for the azimuth and depth combinations and according to annular material specified for the corresponding simulated scenario. The synthetic modeling and lab data 201 may already be organized as a training dataset or may be pre-processed to form a training dataset.

At stages $B_1$-$B_n$, the system 202 executes program code that computes values for an acoustic property of a specified annular material for each azimuth (i) and each depth of each simulated scenario (n). As stated earlier, this program code implements a mathematical model assuming ideal conditions (e.g., tool is centered in the casing, casing has a uniform thickness, inner wall of the casing is clear of any debris, fluid inside the casing has an attenuation of zero). The system 202 computes the acoustic property values based on the acoustic measurements in the synthetic modeling and lab data 201. Graphs 205 represent the computed acoustic property values across azimuths of one depth of n simulated scenarios. At stage B1, the system 202 computes values for the acoustic property of a specified annular material for each azimuth (i) and each depth of simulated scenario 1, and repeats this at each stage until the system 202 has computed values for the acoustic property of the specified annular material for each azimuth (i) and each depth of simulated scenario n.

At stages $C_1$-$C_n$, the system 202 generates feature vectors 206 based on the scenarios represented in the data 201. At each of the stages $C_1$-$C_n$, the system 202 generates one of the feature vectors 206 for each azimuth at each depth of the scenario corresponding to the stage—a first scenario at stage $C_1$, a second scenario at stage $C_2$, etc. Each of the feature vectors 206 would be populated with features as previously described. The feature vectors 206 form part of the training dataset. The system 202 also computes corresponding targets 214 for stages $C_1$-$C_n$. The system 202 computes a difference between each value of the ideal condition acoustic property values and each corresponding value of non-ideal acoustic property values 204. These differences represent amounts the computed acoustic property values 205 need to be adjusted/corrected to mitigate ideal condition artifacts and yield more accurate acoustic property values of the annular material. The non-ideal acoustic property values 204 are either extracted from the synthetic modeling and lab data 201 or determined from the synthetic modeling and lab data 201. Extracting the non-ideal acoustic property values 204 from the synthetic modeling or lab data 201 refers to reading or copying the values out since the values were already generated as part of generating the data 201. Determining the non-ideal acoustic property values 204 from the synthetic modeling and lab data 201 refers to an additional operation (e.g., calculating) the non-ideal acoustic property values 204 from the synthetic modeling and lab data 201.

At stages $D_1$-$D_n$, the system 202 inputs the feature vectors 206 into the model trainer 212 for training an untrained model 211. The system 202 can batch input the feature vectors 206 or individually input the feature vectors 202 depending upon the model trainer 212.

At stage F, the model trainer 212 trains the model 211 according to an underlying training algorithm Depending upon robustness of the training dataset (i.e., the synthetic data 201 and targets 214 in this illustration), training of the model 211 will yield a trained model that output corrections that can be applied to acoustic property values with ideal condition artifacts for a myriad of actual non-ideal conditions.

The following flowcharts depict example operations for the generation of corrections for computed acoustic property values. The flowcharts are provided to aid in understanding the illustrations and are not to be used to limit scope of the claims. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Figure 3:
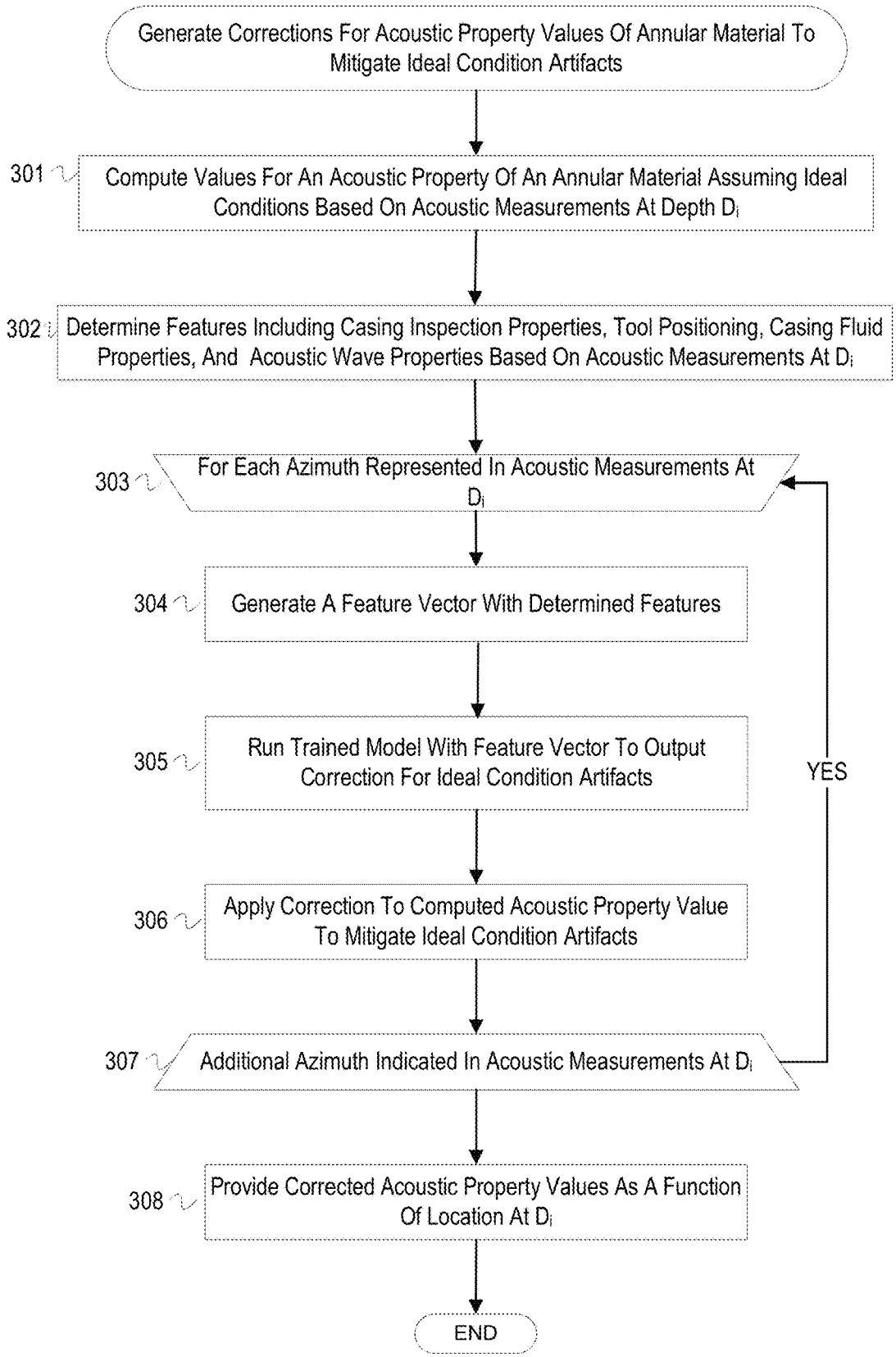
FIG. 3 is a flowchart of example operations to generate corrections for acoustic property values of an annular material to mitigate ideal condition artifacts.

FIG. 3 is a flowchart of example operations to generate corrections for acoustic property values of an annular material to mitigate ideal condition artifacts. The example operations of FIG. 3 are described with references to an acoustic property correction predictor. The operations of FIG. 3 can be repeated for every depth indicated in acoustic measurements obtained. As noted earlier, the acoustic measurements are generated from acoustic waves, such as sonic or ultrasonic data, that is processed by program code.

At block 301, the acoustic property correction predictor computes values for an acoustic property of an annular material assuming ideal conditions based on acoustic measurements at depth $D_i$. The acoustic property values are computed assuming ideal conditions which include, but are not limited to, radial distance between the tool transducer and the inner wall of the casing is uniform at every azimuth, casing thickness is uniform at every azimuth, and fluid inside the casing has an attenuation of zero. The ideal condition assumptions introduce artifacts into the computed acoustic property values such that the computed acoustic property values depict an inaccurate representation of the annular material. For example, if an annular material at a depth is fresh water, the impedance of the annular material at every azimuth of the depth is about 1.48 MPa. The mathematical model that computes impedance assumes, for example, a uniform casing thickness at every azimuth. When acoustic measurements indicate a variation in thickness, the mathematical model does not account for this variation, leading to artifacts in the calculation and an impedance value that does not equal to 1.48 MPa. The acoustic property values can be, but are not limited to, impedance and flexural attenuation and the features for each respective acoustic property will vary.

At block 302, acoustic property correction predictor determines features for predicting an acoustic property value correction from the acoustic measurements at depth $D_i$. The features include casing inspection properties, tool positioning, casing fluid properties, and acoustic wave features based on acoustic measurements at depth $D_i$. Alternate features can be determined from the acoustic measurements at depth $D_i$ based on the desired acoustic property values. Casing inspection properties comprise casing thickness at an azimuth of depth $D_i$, casing thickness of at least one adjacent azimuth of depth $D_i$, and eccentricity of the casing of depth $D_i$. Tool positioning comprises an offset of the transducer face from the inner wall of the casing of depth $D_i$. Casing fluid properties comprises the attenuation of fluid inside the casing at depth $D_i$. Acoustic wave features comprise an angle of incidence at the inner surface of the casing at depth $D_i$ and an amplitude of the first acoustic wave off the inner surface of the casing at depth $D_i$. These example features represent the condition of the wellbore when computing the acoustic property value and are not accounted for in the mathematical model that computes acoustic property values.

At block 303, the acoustic property correction predictor begins processing the features for each azimuth of depth $D_i$. The tool or a process that took the acoustic measurements and/or derived the features from the acoustic measurements may have stored the features in a data structure or file that organizes the information per azimuth. The data structure or file can include data that specifies the azimuths, or the azimuths can be indicated in metadata of the structure of file.

At block 304, the acoustic property correction predictor generates a feature vector with the determined features. To generate accurate corrections, some features of the feature vector include relative changes in quantities with respect to the mean value of the feature obtained in the acoustic measurements. For example, the mean value of casing thickness at every azimuth of a depth is 0.40 inches and the actual casing thickness at an azimuth is 0.42 inches, giving a 5% difference in casing thickness at that azimuth. As another example, the offset of the transducer at an azimuth will differ from the mean offset of the transducer at every azimuth if the transducer is not centered in the casing. Other features of the feature vector can be absolute values, for example, eccentricity and attenuation of fluid inside the casing. Other features that are not based on the acoustic measurements can be included in the feature vector. For example, the outer diameter of the casing can be included as a feature to assist the model in generating corrections based on training datasets that contain casings with similar outer diameters.

At block 305, a trained model is run with the feature vector to output corrections for ideal condition artifacts. The trained model is trained with data from a variety of scenarios because of the large variable space. Sufficient training data captures various scenarios so that the model can generate predictions for scenarios that are encountered. For example, the training data contains acoustic measurements for a 4.5-inch and 7-inch casing. If the model encounters a scenario with a 5-inch casing, the previous training with the 4.5 inch casing scenario allows the model to reasonably fit the 5-inch casings scenario. In some embodiments, the corrections generated by the trained model are expressed as a percentage relative to the computed acoustic property values.

At block 306, the acoustic property correction predictor applies the correction to a computed acoustic property value to mitigate ideal condition artifacts. The correction mitigates ideal condition artifacts introduced by the acoustic property mathematical model when wellbore conditions are not considered.

At block 307, the acoustic property correction predictor determines whether there is an additional azimuth indicated in the acoustic measurements at $D_i$. A feature vector and ultimately a correction is generated for each azimuth indicated in the acoustic measurements. In some embodiments, acoustic measurements can be taken at 1, 4, 90, or 360 azimuths at each depth. Additionally, the acoustic measurements can be taken at one target depth, one or more target intervals of depths, a step interval of depths such as every 50 meters, or the entire cased section of the wellbore.

At block 308, the acoustic property correction predictor provides corrected acoustic properties values as a function of azimuth at $D_i$. Aggregation of the corrected acoustic properties at every azimuth of depth $D_i$ form a corrected acoustic property value profile that depicts an accurate representation of the annular material for evaluation. The acoustic properties can be utilized to evaluate the annular material at depth $D_i$ such as cement bonding to the casing.

Figure 4:
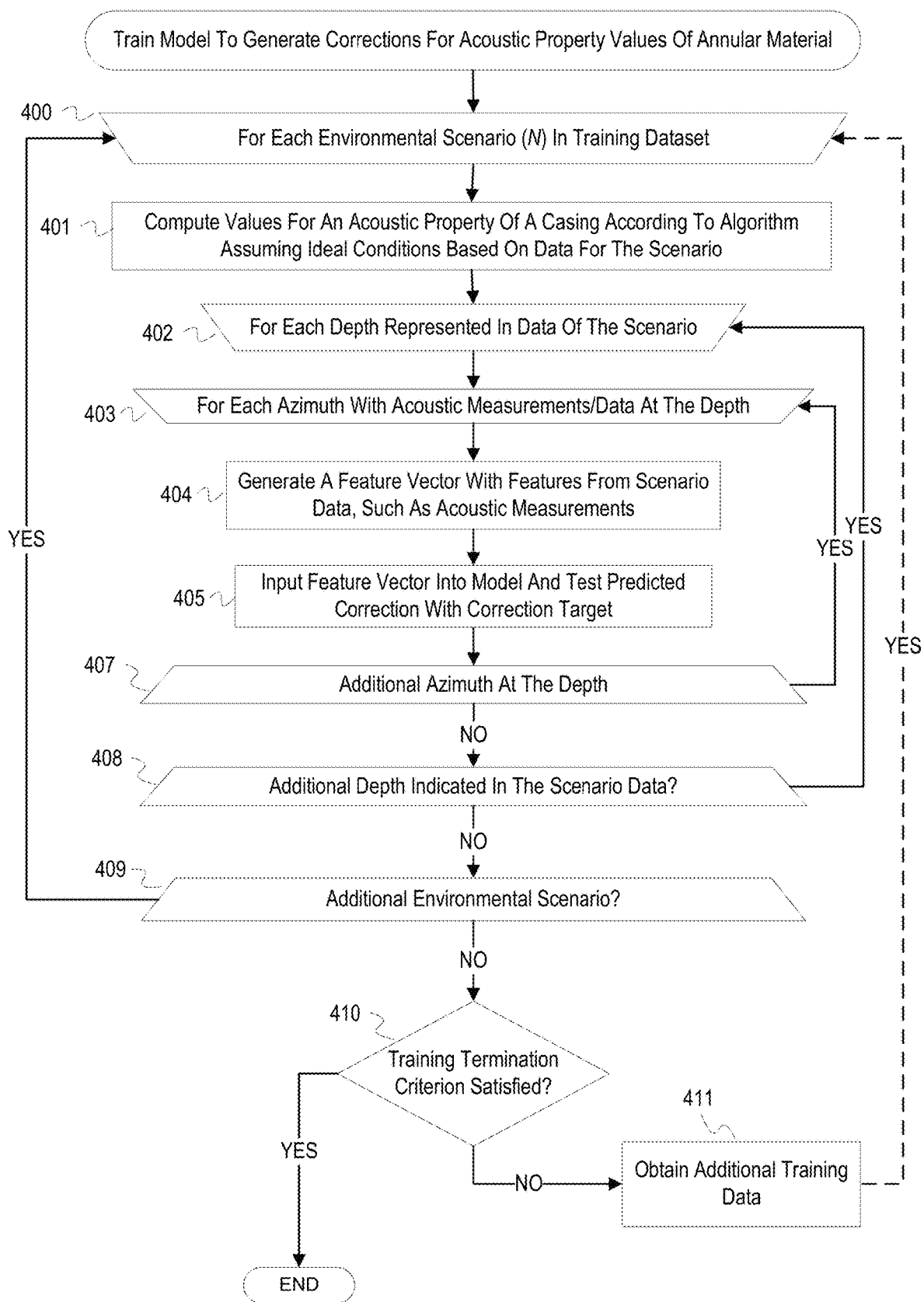
FIG. 4 is a flowchart of example operations for training a model to generate corrections for computed acoustic property values of an annular material.

FIG. 4 is a flowchart of example operations for training a model to generate corrections for computed acoustic property values of an annular material. To capture the variety of scenarios that the acoustic property correction generator may encounter, the model is trained with a training dataset(s) representing various environmental scenarios (n) that are a sample of a large variable space. The training data can be sourced from historical data and/or wellbore simulations. The flowchart is described with reference to a model trainer as performing the example operations. The model trainer performs training operations with the training dataset, which yield a broader range of environmental scenarios for the trained model.

At block 400, the model trainer processes the data for each of N environmental scenarios. The number of environmental scenarios is chosen with the intent to efficiently represent the variable space corresponding to the different possible wellbore configurations, formation fluids, casing variations, etc. The environmental scenarios can be pseudo-randomly vary some variables (e.g., casing thickness variation) and specify other variables (e.g., casing diameter). The scenarios can be created in a lab that simulates a cased wellbore in a geological formation and/or be historical data obtained from a database of offset cased wellbores.

At block 401, the model trainer computes values for an acoustic property of an annular material according to an algorithm or mathematical model that assumes ideal conditions based on the data for the scenario. This is done for each azimuth at each depth represented in the environmental scenario.

At block 402, the model trainer selects a depth of the environmental scenario for training an untrained model.

Although a scenario can have data for a single depth, a scenario will likely have data across multiple depths.

At block 403, the model trainer selects one of multiple azimuths represented in the environmental scenario at the selected depth for training the untrained model with a feature vector for each azimuth represented in the environmental scenarios. Training with the training dataset involves inputting the feature vectors for the azimuths and testing each output with corresponding differences between the ideal condition acoustic property values and the non-ideal acoustic property values. Continuing with the earlier assumption that x represents a feature vector and y represents a prediction, which in this case is a difference between an acoustic property value that accounts for actual or non-ideal conditions and an acoustic property value computed with an algorithm with ideal condition artifacts, then a resulting model can be described with the expression: $y=f(x)$.

Since the form of the underlying function $f(x)$ is unknown, the training process approximates (or the trained model is an approximation) of $f(x)$.

At block 404, the model trainer generates a feature vector with features from the scenario data. The features are those described with reference to earlier figures At block 405, the model trainer inputs the feature vector into the untrained model and tests the predicted correction against a corresponding target correction. The model trainer can compute the target correction in each iteration, compute the target corrections for each environmental scenario before feeding feature vectors into the model, compute the target corrections across the training dataset, etc. If computed in advance, the training dataset can be organized to associate the target differences with the feature vectors.

At block 407, the model trainer determines whether there is an additional azimuth to process at the selected depth of the current environmental scenario. If there is an additional azimuth at the currently selected depth, then operational flow returns to block 403. Otherwise, operational flow continues to block 408.

At block 408, the model trainer determines whether there is an additional depth represented in the current environmental scenario. If the current environmental scenario includes data for an additional depth, then operational flow returns to block 402 for the model trainer to select a next depth. If not, then operational flow proceeds to block 409.

At block 409, the model trainer determines whether there is data for an additional environmental scenario to process. If there is data for an additional environmental scenario to process, then operational flow returns to block 400. Otherwise, operational flow proceeds to block 410.

At block 410, the model trainer determines whether a training termination criterion has been satisfied. The criterion may be completion of processing of the initial training dataset. However, the termination criterion can specify performance threshold and/or amount of training data. If the termination criterion has been satisfied, then training has completed. If the training termination criterion is not satisfied, additional training data can be obtained to train the model as stated in block 411. Additional data can be obtained by creating different environmental scenarios in a lab or obtaining other historical data.

VARIATIONS

As mentioned earlier, embodiments can use the acoustic property correction generator to generate corrections for various types of acoustic property values of annular material including, but not limited to, impedance and flexural attenuation. Embodiments can also use various features in the feature vector to be input into the trained model to generate corrections for an acoustic property value. For example, the features for correcting impedance will differ from the features for correcting flexural attenuation.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
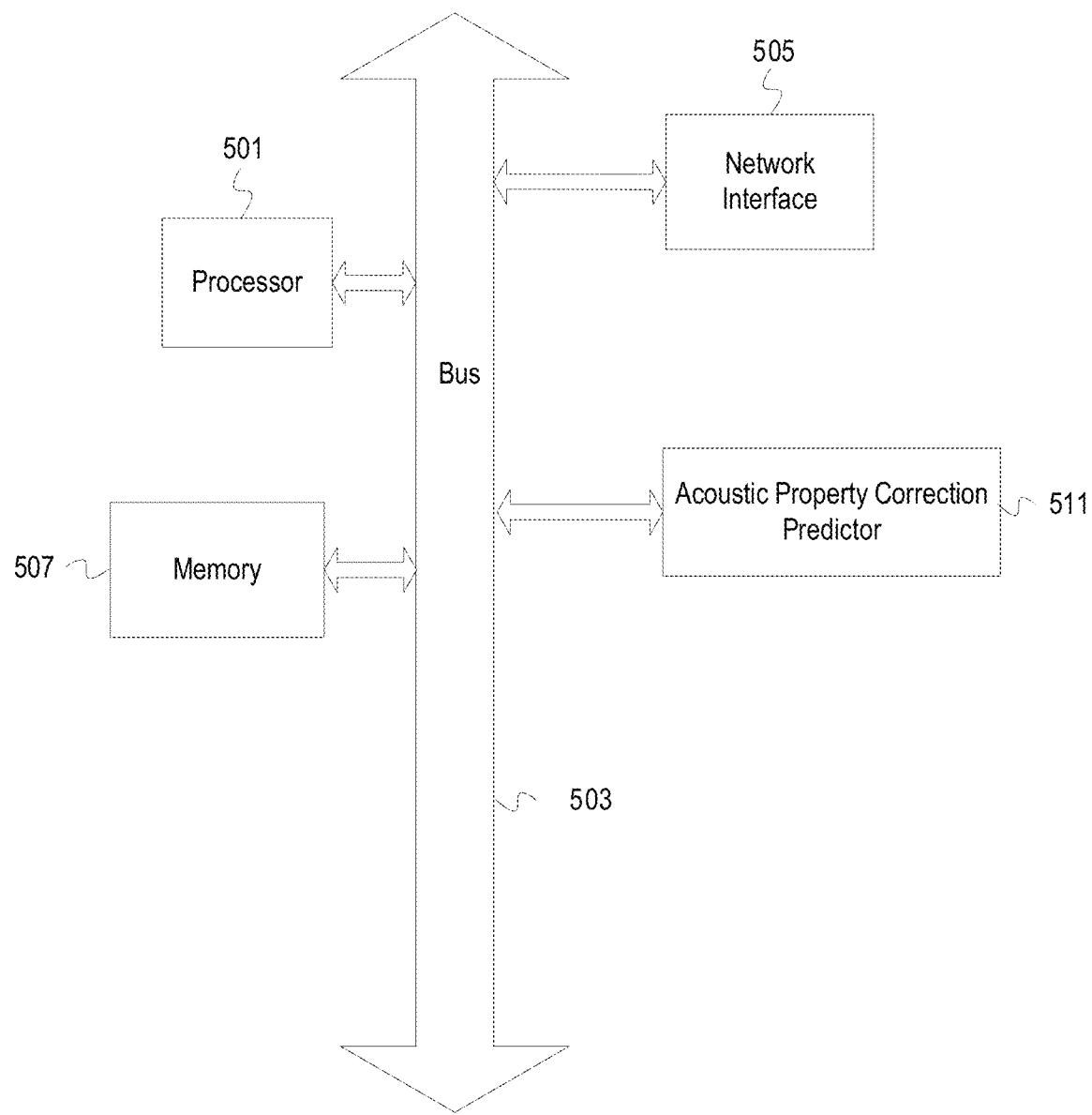
FIG. 5 depicts an example computer system with an acoustic property correction generator to mitigate ideal condition artifacts.

FIG. 5 depicts an example computer system with an acoustic property correction generator to mitigate ideal condition artifacts. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system communicates via transmissions to and/or from remote devices via the network interface 505 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes acoustic property correction generator 511. The acoustic property correction generator 511 generates corrections for acoustic property values of annular material to mitigate ideal condition artifacts. The acoustic property correction generator 511 run with at least some of the aforementioned features that represent variations in measurements across azimuth at a given depth. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for generating corrections for computed acoustic property values of an annular material as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Embodiment 1: A method comprising obtaining acoustic measurements for a first depth in a cased borehole; generating feature vectors for azimuths represented in the acoustic measurements, wherein each feature vector comprises features of a respective azimuth based, at least in part, on casing inspection property features based on the acoustic measurements, fluid acoustic property feature based on the acoustic measurements, tool based features, and acoustic wave features; running a trained model for each of the feature vectors to obtain corrections for computed values of an acoustic property of an annular material of the cased borehole, wherein the computed values include artifacts of one or more assumptions incorporated into a mathematical model used to compute the values; and applying the corrections to the computed values to obtain corrected values of the acoustic property of the annular material.

Embodiment 2: The method of Embodiment 1, further comprising evaluating the annular material based, at least in part, on the corrected values of the acoustic property of the annular material.

Embodiment 3: The method of Embodiment 1, wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements.

Embodiment 4: The method of Embodiment 1, wherein the fluid acoustic property feature comprises attenuation of a fluid in the cased borehole.

Embodiment 5: The method of Embodiment 1, wherein the tool based features comprise a relative change in offset of a transducer face from an inner surface of a casing of the borehole from a mean offset of the transducer face at a depth in the acoustic measurements and eccentricity of the tool in the casing.

Embodiment 6: The method of Embodiment 1, wherein the acoustic wave features comprise an angle of incidence at the inner surface of a casing and a relative change in an amplitude of a first reflection of a first acoustic wave off the inner surface of the casing at a respective azimuth from a mean amplitude of the first reflection of the first acoustic wave in the acoustic measurements.

Embodiment 7: The method of Embodiment 1, wherein the computed acoustic property value comprises one of acoustic impedance and flexural attention.

Embodiment 8: The method of Embodiment 1, wherein the trained model comprises at least one of an ensemble of decision trees model and an artificial neural network model.

Embodiment 9: The method of Embodiment 1, wherein the trained model was trained with training data representing different wellbore configurations and variations in casing properties.

Embodiment 10: The method of Embodiment 1, wherein the acoustic measurements are based on at least one of sonic and ultrasonic data.

Embodiment 11: The method of Embodiment 10, wherein the acoustic measurements are obtained with a pulse-echo or a pitch-catch technique.

Embodiment 12: The method of Embodiment 1 further comprising training a model to obtain the trained model, wherein training the model comprises: obtaining acoustic measurements of a plurality of environment scenarios representing different wellbore configurations and various non-uniform casing properties; generating feature vectors for each azimuth at each depth of each environmental scenario represented in the acoustic measurements; computing a correction target for each of the feature vectors, wherein computing the correction target comprises computing a difference between an ideal condition value of an acoustic property of an annular material corresponding to the feature vector and a non-ideal condition value of the acoustic property of the annular material corresponding to the feature vector; and running an untrained model on the feature vectors and testing the output corrections with the correction targets.

Embodiment 13: The method of Embodiment 1 further comprising aggregating corrected values of the acoustic property of the annular material of the cased borehole to generate a wellbore profile at the first depth.

Embodiment 14: One or more non-transitory machine-readable media comprising program code, the program code to obtain acoustic measurements for a first depth in a cased borehole; generate feature vectors for azimuths represented in the acoustic measurements, wherein each feature vector comprises features of a respective azimuth based, at least in part, on casing inspection property features based on the acoustic measurements, fluid acoustic property feature based on the acoustic measurements, a tool based feature, and acoustic wave features; run a trained model for each of the feature vectors to obtain corrections for computed values of an acoustic property of an annular material of the cased borehole, wherein the computed values include artifacts of one or more assumptions incorporated into a mathematical model used to compute the values; and apply the corrections to the computed values to obtain corrected values of the acoustic property of the annular material.

Embodiment 15: The non-transitory machine-readable media of Embodiment 14, wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements.

Embodiment 16: The non-transitory machine-readable media of Embodiment 14, wherein the fluid acoustic property feature comprises attenuation of a fluid in the cased borehole, the tool based features comprise a relative change in an offset of a transducer face from an inner surface of a casing of the borehole at a respective azimuth from a mean offset of the transducer face at a depth in the acoustic measurements and eccentricity of the tool in the casing, and the acoustic wave features comprise an angle of incidence at the inner surface of a casing and a relative change in an amplitude of a first reflection of a first acoustic wave off the inner surface of the casing at a respective azimuth from a mean amplitude of the reflection of the first acoustic wave at a depth in the acoustic measurements.

Embodiment 17: The non-transitory machine-readable media of Embodiment 14, wherein the computed acoustic property value comprises one of acoustic impedance and flexural attention.

Embodiment 18: An apparatus comprising a processor; and a machine-readable medium having program code executable by the processor to cause the apparatus to obtain acoustic measurements for a first depth in a cased borehole; generate feature vectors for azimuths represented in the acoustic measurements, wherein each feature vector comprises features of a respective azimuth based, at least in part, on casing inspection property features based on the acoustic measurements, fluid acoustic property feature based on the acoustic measurements, a tool based feature, and acoustic wave features; run a trained model for each of the feature vectors to obtain corrections for computed values of an acoustic property of an annular material of the cased borehole, wherein the computed values include artifacts of one or more assumptions incorporated into a mathematical model used to compute the values; and apply the corrections to the computed values to obtain corrected values of the acoustic property of the annular material.

Embodiment 19: The apparatus of Embodiment 18, wherein the machine-readable medium further has program code executable by the processor to cause the apparatus to obtain acoustic measurements of a plurality of environment scenarios representing different wellbore configurations and various non-uniform casing properties; generate feature vectors for each azimuth at each depth of each environmental scenario represented in the acoustic measurements; compute a correction target for each of the feature vectors, wherein computing the correction target comprises computing a difference between an ideal condition value of an acoustic property of an annular material corresponding to the feature vector and a non-ideal condition value of the acoustic property of the annular material corresponding to the feature vector; and run an untrained model on the feature vectors and testing the output corrections with the correction targets.

Embodiment 20: The apparatus of Embodiment 18, wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements, wherein the fluid acoustic property feature comprises attenuation of a fluid in the cased borehole, wherein the tool based feature comprises a relative change in an offset of a transducer face from an inner surface of a casing of the borehole at a respective azimuth from a mean offset of the transducer face at the depth in the acoustic measurements and eccentricity of the tool in the casing, and wherein the acoustic wave features comprise an angle of incidence at the inner surface of a casing and a relative change in an amplitude of a first reflection of a first acoustic wave off the inner surface of the casing at a respective azimuth from a mean amplitude of the first reflection of the first acoustic wave at the depth in the acoustic measurements.

What is claimed is:
1. A method comprising:
obtaining acoustic measurements for a first depth in a cased borehole;
generating feature vectors for azimuths represented in the acoustic measurements, wherein each feature vector comprises features of a respective azimuth based, at least in part, on casing inspection property features based on the acoustic measurements, fluid acoustic property feature based on the acoustic measurements, tool based features, and acoustic wave features;
running a trained model for each of the feature vectors to obtain corrections for computed values of an acoustic property of an annular material of the cased borehole, wherein the computed values include artifacts of one or more assumptions incorporated into a mathematical model used to compute the values; and applying the corrections to the computed values to obtain corrected values of the acoustic property of the annular material.

2. The method of claim 1, further comprising evaluating the annular material based, at least in part, on the corrected values of the acoustic property of the annular material.

3. The method of claim 1, wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements.

4. The method of claim 1, wherein the fluid acoustic property feature comprises attenuation of a fluid in the cased borehole.

5. The method of claim 1, wherein the tool based features comprise a relative change in offset of a transducer face from an inner surface of a casing of the borehole from a mean offset of the transducer face at a depth in the acoustic measurements and eccentricity of the tool in the casing.

6. The method of claim 1, wherein the acoustic wave features comprise an angle of incidence at the inner surface of a casing and a relative change in an amplitude of a first reflection of a first acoustic wave off the inner surface of the casing at a respective azimuth from a mean amplitude of the first reflection of the first acoustic wave in the acoustic measurements.

7. The method of claim 1, wherein the computed acoustic property value comprises one of acoustic impedance and flexural attention.

8. The method of claim 1, wherein the trained model comprises at least one of an ensemble of decision trees model and an artificial neural network model.

9. The method of claim 1, wherein the trained model was trained with training data representing different wellbore configurations and variations in casing properties.

10. The method of claim 1, wherein the acoustic measurements are based on at least one of sonic and ultrasonic data.

11. The method of claim 10, wherein the acoustic measurements are obtained with a pulse-echo or a pitch-catch technique.

12. The method of claim 1 further comprising training a model to obtain the trained model, wherein training the model comprises:
obtaining acoustic measurements of a plurality of environment scenarios representing different wellbore configurations and various non-uniform casing properties;
generating feature vectors for each azimuth at each depth of each environmental scenario represented in the acoustic measurements;
computing a correction target for each of the feature vectors, wherein computing the correction target comprises computing a difference between an ideal condition value of an acoustic property of an annular material corresponding to the feature vector and a non-ideal condition value of the acoustic property of the annular material corresponding to the feature vector; and
running an untrained model on the feature vectors and testing the output corrections with the correction targets.

13. The method of claim 1, further comprising aggregating corrected values of the acoustic property of the annular material of the cased borehole to generate a wellbore profile at the first depth.

14. One or more non-transitory machine-readable media comprising program code, the program code to:
obtain acoustic measurements for a first depth in a cased borehole;
generate feature vectors for azimuths represented in the acoustic measurements, wherein each feature vector comprises features of a respective azimuth based, at least in part, on casing inspection property features based on the acoustic measurements, fluid acoustic property feature based on the acoustic measurements, a tool based feature, and acoustic wave features;
run a trained model for each of the feature vectors to obtain corrections for computed values of an acoustic property of an annular material of the cased borehole, wherein the computed values include artifacts of one or more assumptions incorporated into a mathematical model used to compute the values; and
apply the corrections to the computed values to obtain corrected values of the acoustic property of the annular material.

15. The non-transitory machine-readable media of claim 14, wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements.

16. The non-transitory machine-readable media of claim 14, wherein the fluid acoustic property feature comprises attenuation of a fluid in the cased borehole, the tool based features comprise a relative change in an offset of a transducer face from an inner surface of a casing of the borehole at a respective azimuth from a mean offset of the transducer face at a depth in the acoustic measurements and eccentricity of the tool in the casing, and the acoustic wave features comprise an angle of incidence at the inner surface of a casing and a relative change in an amplitude of a first reflection of a first acoustic wave off the inner surface of the casing at a respective azimuth from a mean amplitude of the reflection of the first acoustic wave at a depth in the acoustic measurements.

17. The non-transitory machine-readable media of claim 14, wherein the computed acoustic property value comprises one of acoustic impedance and flexural attention.

18. An apparatus comprising:
a processor; and
a machine-readable medium having program code executable by the processor to cause the apparatus to,
obtain acoustic measurements for a first depth in a cased borehole;
generate feature vectors for azimuths represented in the acoustic measurements, wherein each feature vector comprises features of a respective azimuth based, at least in part, on casing inspection property features based on the acoustic measurements, fluid acoustic property feature based on the acoustic measurements, a tool based feature, and acoustic wave features;
run a trained model for each of the feature vectors to obtain corrections for computed values of an acoustic property of an annular material of the cased borehole, wherein the computed values include artifacts of one or more assumptions incorporated into a mathematical model used to compute the values; and
apply the corrections to the computed values to obtain corrected values of the acoustic property of the annular material.

19. The apparatus of claim 18, wherein the machine-readable medium further has program code executable by the processor to cause the apparatus to:
- obtain acoustic measurements of a plurality of environment scenarios representing different wellbore configurations and various non-uniform casing properties;
- generate feature vectors for each azimuth at each depth of each environmental scenario represented in the acoustic measurements;
- compute a correction target for each of the feature vectors, wherein computing the correction target comprises computing a difference between an ideal condition value of an acoustic property of an annular material corresponding to the feature vector and a non-ideal condition value of the acoustic property of the annular material corresponding to the feature vector; and
- run an untrained model on the feature vectors and testing the output corrections with the correction targets.

20. The apparatus of claim 18,
wherein the casing inspection property features comprise a relative change in thickness of a casing at the respective azimuth from a mean thickness of the casing at a depth in the acoustic measurements and a relative change in the thickness of the casing of at least a first adjacent azimuth from the mean thickness of the casing at the depth in the acoustic measurements, wherein the fluid acoustic property feature comprises attenuation of a fluid in the cased borehole, wherein the tool based feature comprises a relative change in an offset of a transducer face from an inner surface of a casing of the borehole at a respective azimuth from a mean offset of the transducer face at the depth in the acoustic measurements and eccentricity of the tool in the casing, and wherein the acoustic wave features comprise an angle of incidence at the inner surface of a casing and a relative change in an amplitude of a first reflection of a first acoustic wave off the inner surface of the casing at a respective azimuth from a mean amplitude of the first reflection of the first acoustic wave at the depth in the acoustic measurements.

* * * * *